US007412312B2

(12) United States Patent
Leblanc et al.

(10) Patent No.: US 7,412,312 B2
(45) Date of Patent: Aug. 12, 2008

(54) SYSTEM FOR AUTOMATICALLY DETERMINING A PUBLIC TRANSPORT VEHICLE EMERGENCY BRAKING CHARACTERISTICS, IN PARTICULAR OF A RAILWAY VEHICLE

(75) Inventors: Julien Leblanc, Champigny sur Marne (FR); Bruno Perrin, Mandelieu les Termes (FR); Vincent Poupinet, Voisenon (FR)

(73) Assignee: Regie Autonome des Transports Parisiens, Paris Cedex (FR)

( * ) Notice: Subject to any disclaimer, the term of this patent is extended or adjusted under 35 U.S.C. 154(b) by 769 days.

(21) Appl. No.: 10/497,799

(22) PCT Filed: Dec. 3, 2002

(86) PCT No.: PCT/FR02/04158

§ 371 (c)(1),
(2), (4) Date: Nov. 12, 2004

(87) PCT Pub. No.: WO03/048710

PCT Pub. Date: Jun. 12, 2003

(65) Prior Publication Data

US 2005/0065677 A1    Mar. 24, 2005

(30) Foreign Application Priority Data

Dec. 7, 2001    (FR)    ................................ 01 15875

(51) Int. Cl.
*G01M 17/00*    (2006.01)
(52) U.S. Cl. .............................. 701/29; 701/33; 701/41; 701/75; 701/76; 701/82; 141/1; 141/38; 141/83; 141/271; 303/113.2; 303/140; 340/441; 340/442; 340/446; 340/447; 73/146; 73/146.2; 73/146.5; 73/146.8

(58) Field of Classification Search .................. 701/29, 701/33, 41, 75, 76, 82, 83, 91; 141/1, 38, 141/83, 271; 303/113.2, 140, 438; 340/441, 340/442, 446, 447; 73/146, 146.2, 146.5, 73/146.8; 180/443
See application file for complete search history.

(56) References Cited

U.S. PATENT DOCUMENTS 5,744,707 A    4/1998    Kull (Continued)

FOREIGN PATENT DOCUMENTS

BE    500 130    1/1951

(Continued)

*Primary Examiner*—Khoi H. Tran
*Assistant Examiner*—McDieunel Marc
(74) *Attorney, Agent, or Firm*—Young & Thompson

(57) ABSTRACT

A system for automatically determining a public transport vehicle emergency braking characteristics, in particular of a railway vehicle, includes elements (1) for measuring the vehicle speed, elements (2) for measuring the distance travelled by it, and elements (3) for triggering an emergency braking of the vehicle to actuate its braking elements (4). The system includes elements for detecting (5) the activation of the elements (3) triggering the emergency braking and elements for detecting (5) when the vehicle stops, adapted to activate/deactivate the operation of elements (9) acquiring data concerning the speed and the distance travelled by the vehicle for a time interval running between the activation of the emergency triggering elements and the moment the vehicle stops, and elements (9) for analyzing the data to deliver at least a information concerning the distance travelled by the vehicle during the time interval.

9 Claims, 4 Drawing Sheets

U.S. PATENT DOCUMENTS

Figure 1:
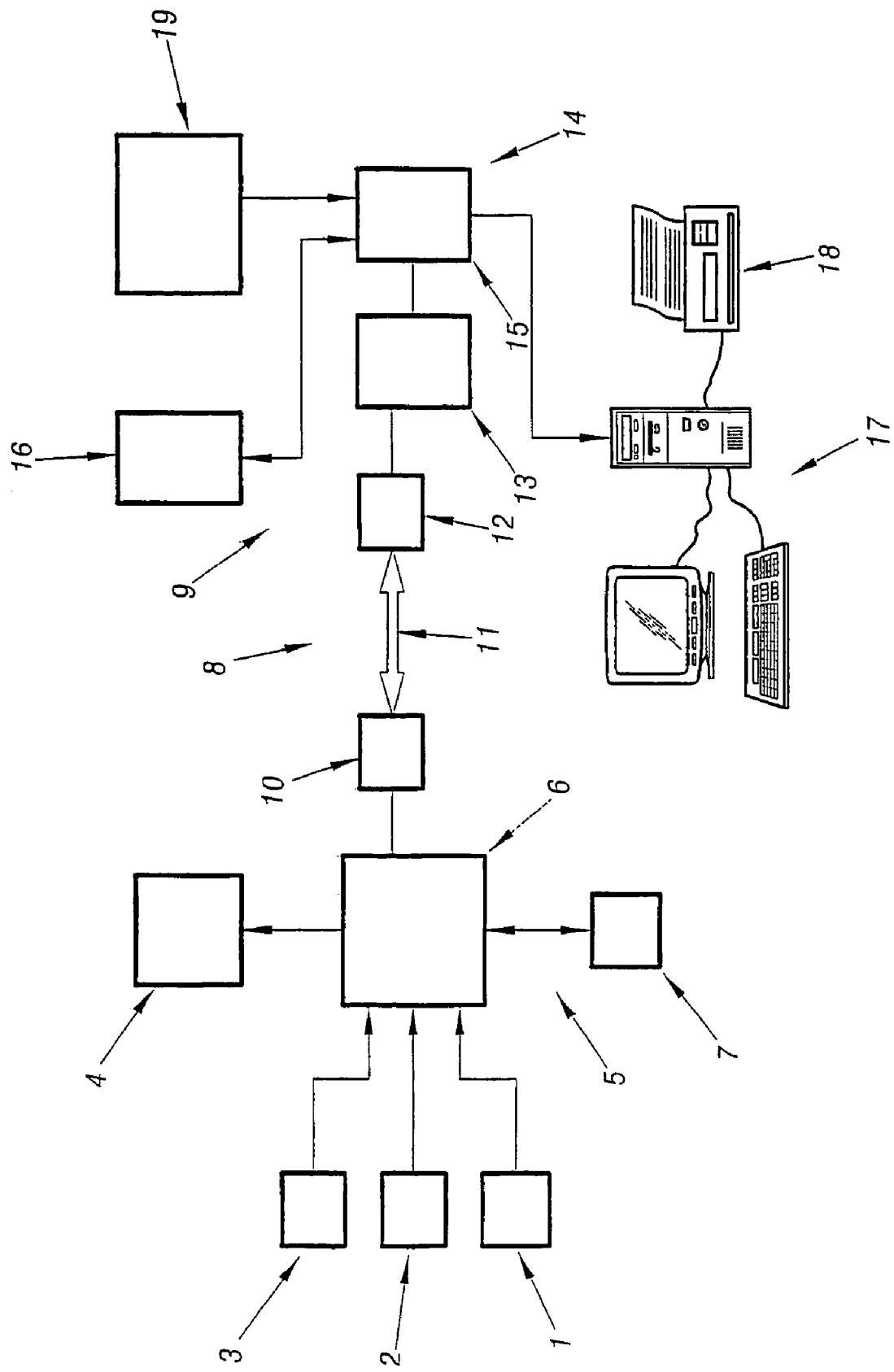

| | | | |
|---|---|---|---|
| 5,815,823 A * | 9/1998 | Engle | 701/19 |
| 6,014,600 A * | 1/2000 | Ferri et al. | 701/29 |
| 6,112,166 A | 8/2000 | Joosten | |
| 6,434,456 B1 * | 8/2002 | Babala et al. | 701/34 |
| 6,606,033 B1 * | 8/2003 | Crocker et al. | 340/901 |
| 6,789,006 B2 * | 9/2004 | Glock et al. | 701/29 |
| 7,327,282 B2 * | 2/2008 | Crocker et al. | 340/936 |
| 2004/0135431 A1 * | 7/2004 | Sekine | 303/140 |
| 2005/0273231 A1 * | 12/2005 | Sayce-Jones | 701/33 |
| 2007/0288142 A1 * | 12/2007 | Maeda et al. | 701/41 |
| 2007/0288145 A1 * | 12/2007 | Maeda et al. | 701/41 |

FOREIGN PATENT DOCUMENTS

| | | |
|---|---|---|
| CH | 410 467 | 3/1966 |
| FR | 2 112 212 | 6/1972 |

\* cited by examiner

SYSTEM FOR AUTOMATICALLY DETERMINING A PUBLIC TRANSPORT VEHICLE EMERGENCY BRAKING CHARACTERISTICS, IN PARTICULAR OF A RAILWAY VEHICLE

This invention relates to a system for automatically determining the emergency braking characteristics of a vehicle, in particular a railway vehicle, for public transport.

It is known that passenger safety is always a concern in this field.

In particular these transport vehicles must have preset emergency braking characteristics.

The constructors and users of this type of rolling stock therefore have to make periodical checks to ensure that these vehicles and in particular their braking systems are functioning correctly.

In the state of the art this is achieved by performing tests on the vehicles, which are caused to move under test conditions, whose features, in particular as regards configuration of the terrain, are known.

A test track is therefore marked out between two conspicuous physical reference points at the limits of a preset maximum stopping distance with which the vehicle must comply when braking. This maximum distance is also called the "acceptability threshold".

The vehicle is then caused to move along the test track at its rated speed. Two operators are aboard the vehicle, one driving the vehicle and the other observing the vehicle's movement prior to the first reference mark to warn the driver to apply the vehicle's emergency braking when the vehicle passes the reference mark by activating corresponding trigger means to activate the vehicle's braking means.

Braking is then maintained until the vehicle comes to a complete stop.

An accelerometer of the mechanical type may be carried on board the vehicle to provide information relating to the vehicle's instantaneous deceleration during this stage.

Once the vehicle has stopped the operator checks where the vehicle has stopped, and in particular its position relative to the second reference mark.

If the vehicle stops after the second reference mark, that is beyond it, the vehicle is considered to have a braking malfunction.

On the other hand if the vehicle stops before the second reference mark, that is in front of it, the operator measures the distance between the vehicle and the second reference mark to determine the vehicle's stopping distance, given that the distance between the two reference marks is known.

The operator, who may need to make corrections to the calculated stopping distance in order to take into account the configuration of the test track terrain, then carries out various operations manually.

He also calculates a deceleration response time for the vehicle.

The operator also compares the calculated stopping distance, which may have been corrected, with a preset acceptability threshold for the vehicle in question and the test conditions in question in order to determine whether or not the vehicle suffers from a braking malfunction.

The operator also examines the deceleration curve and in particular the periods during which braking is increasingly applied and released.

These various items of information and the test results, together with the environmental information, such as that relating to weather conditions at the time of the test, the operator's name, the date, the vehicle number, etc., for example, are then recorded in a report.

It can however be seen that this has a number of disadvantages.

In fact these procedures are relatively time-consuming and burdensome to implement, and require significant logistics.

Furthermore an accelerometer has to be mounted on board the vehicle, and put into operation.

The stopping distance is measured and calculated manually by an operator.

Finally the risks of errors associated with the use of such methods are not negligible because of the fact that the emergency braking triggering means is operated by the vehicle's driver on the instructions of an operator who himself has to visually estimate passage of the vehicle past the first reference mark.

All this results in the fact that these methods give rise to tests with reproducibility and traceability problems.

The purpose of the invention is therefore to overcome these problems.

With this intention the object of the invention is a system for automatically determining the emergency braking characteristics of a transport vehicle, in particular a railway vehicle, for public use, comprising means for measuring the speed of the vehicle, means for measuring the distance travelled by it, and means for initiating emergency braking of the vehicle to activate the latter's braking means, characterised in that it comprises means for detecting activation of the vehicle's emergency braking activation means and means for detecting stopping of the vehicle designed to activate/deactivate operation of the means for acquiring information on speed and distance run by the vehicle during the period of time between triggering the emergency braking activation means and stopping of the vehicle, and means for analysing this information to provide information on at least the distance run by the vehicle during this period.

According to other features:

the analysis means are also designed to provide information on the instantaneous deceleration of the vehicle during this period of time, the analysis means are also designed to provide information on the vehicle's braking means response time subsequent to activation of the emergency braking application means, the analysis means are designed to provide the or each braking characteristic in real time, the analysis means are designed to provide the or each characteristic in delayed time, the analysis means comprise means for correcting the information on distance run by the vehicle determined from the information provided by the acquisition means to take into account the reaction time of these acquisition means, the analysis means comprise means for smoothing the vehicle deceleration information, the smoothing means comprise sliding time window filtering means, the analysis means comprise means for calculating the response time of the braking means according to the relationship $te=tr+tt/2$ where $te$ represents the response time, $tr$ represents the elapsed time between the onset of braking and the time when deceleration of the vehicle reaches 10% of the steady-state deceleration value and $tt$ represents the elapsed time from the onset of braking until the vehicle's deceleration reaches 90% of the steady-state deceleration value, the analysis means comprise means for comparing the or each braking characteristic with corresponding predetermined data or preset test conditions, a predetermined type of vehicle, and a predetermined test configuration, these data being stored in memory means associated with the said analysis means.

Figure 2:
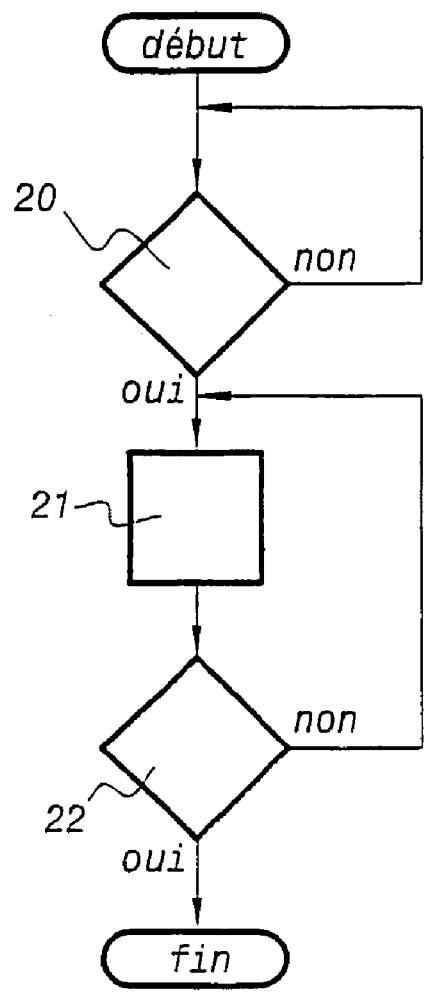
Figure 3:
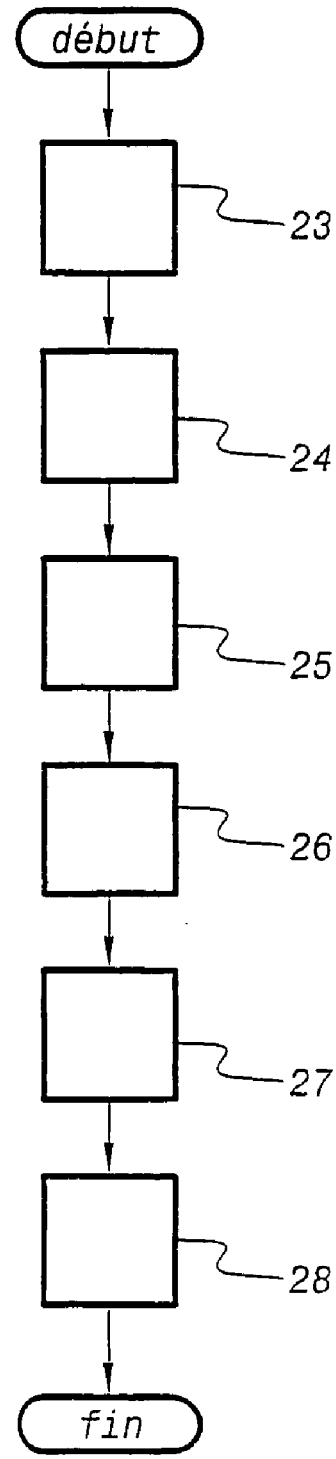
Figure 4:
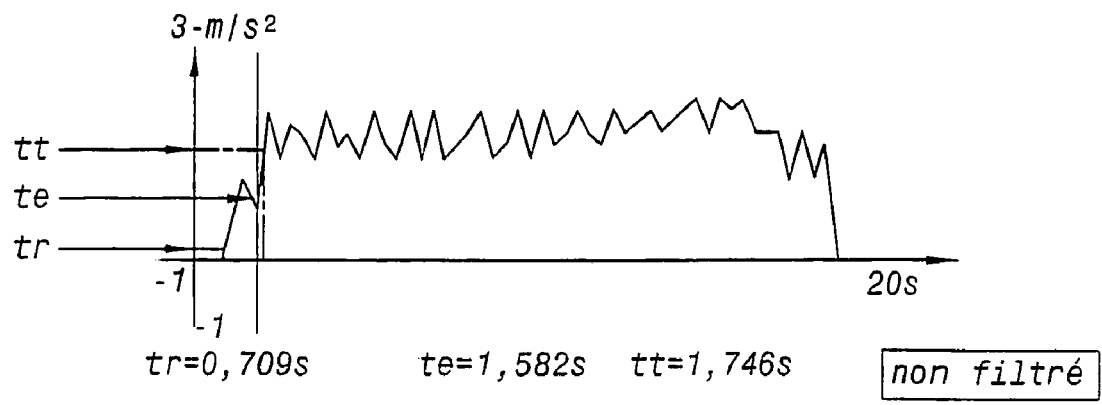
Figure 5:
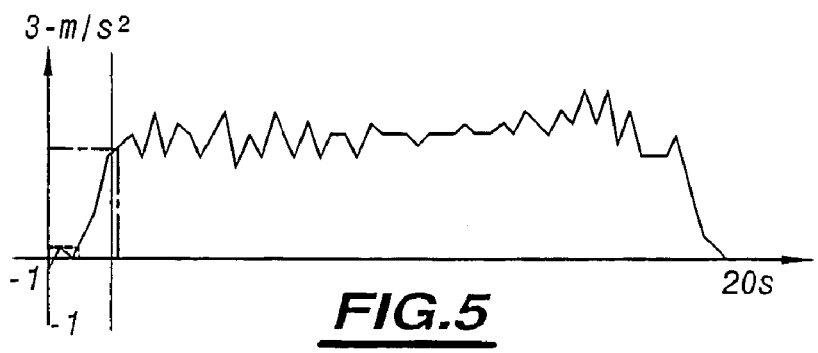
Figure 6:
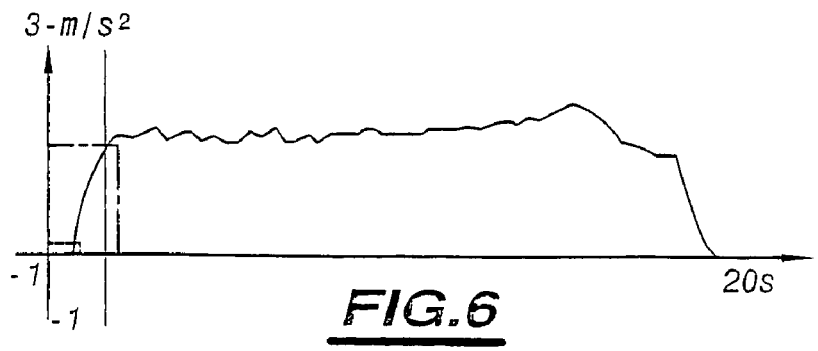
Figure 7:
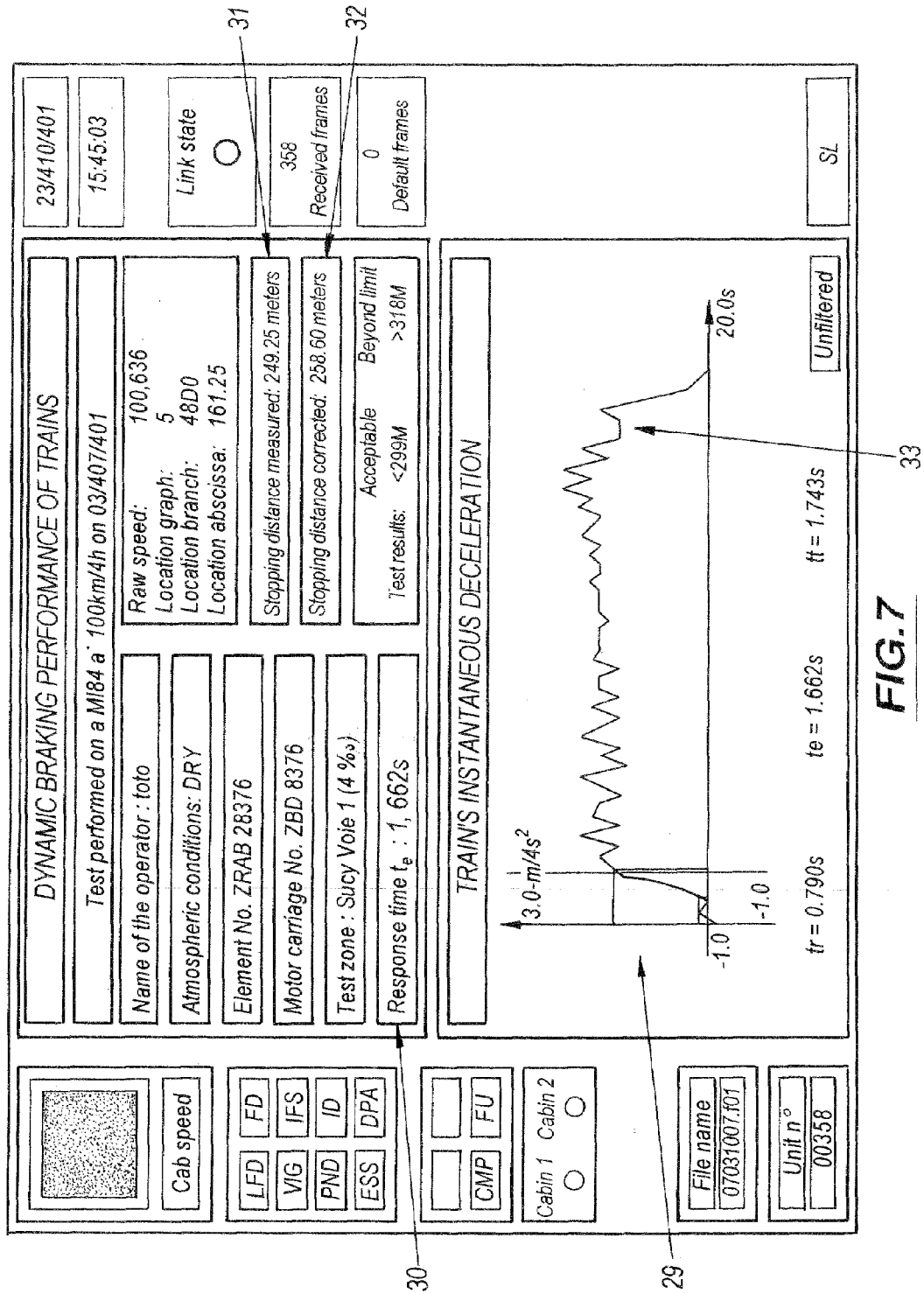

Other advantages and characteristics of the present invention will become clear from the following detailed description which is given with reference to the appended drawings which are provided purely by way of non-limiting example and in which:

FIG. 1 shows a general diagram illustrating the general structure of the determination system according to the invention, FIG. 2 shows a block diagram illustrating a stage in the acquisition of information used in a determination system according to the invention, FIG. 3 shows a block diagram illustrating a stage in analysis of the information used in a system according to the invention, FIG. 4 shows an instantaneous deceleration curve for a train illustrating calculation of the latter's braking means' response time, FIGS. 5 and 6 show instantaneous deceleration curves before (FIG. 5) and after (FIG. 6) smoothing of the corresponding information, and FIG. 7 shows a specimen presentation of the results of a vehicle test.

In fact FIG. 1 shows a system for automatically determining the emergency braking characteristics of a transport vehicle, in particular a railway vehicle, for public use.

Conventionally such a vehicle comprises means for measuring the speed of the vehicle, indicated by general reference number 1, means 2 for measuring the distance run by the latter, and means 3 for applying the emergency braking of the vehicle to activate the latter's braking means, indicated by general reference number 4.

The speed measuring means comprise for example a speedometer, the distance run measuring means comprise for example a kilometre counter and the application means comprise for example an emergency braking button which can be operated by the vehicle's driver in a conventional way.

These various entities are for example connected to a first information processing unit indicated by general reference number 5 and comprise for example any appropriate calculator indicated by general reference number 6 associated with data storage means indicated by general reference number 7.

These various entities are mounted on a vehicle and the information processing unit is for example designed to control operation of the vehicle from the various items of information provided by sensors or other information inputting elements on board.

This information processing unit 5 is also associated with means, indicated by general reference number 8, for the transmission of information towards a tool indicated by general reference number 9.

For this purpose information processing unit 5 is associated with interface means indicated by general reference number 10 between this unit and any information transmission link indicated by general reference number 11.

This link may for example be provided by cable or other means.

Tool 9 also comprises corresponding interface means 12 associated with means 13 forming an input buffer, also connected to a second information processing unit indicated by general reference number 14.

This information processing unit 14 also comprises for example any appropriate calculator indicated by general reference number 15 associated with data storage means indicated by general reference number 16, means providing a user interface indicated by general reference number 17 and comprising for example, in a conventional way, means for the display of information and means for the entry of information by the user.

It will also be noted that a printer indicated by general reference number 18 may be associated with this information processing unit 14.

Finally, this information processing unit 14 may also be associated with means 19 for the storage of information on the test configuration, the vehicle and predetermined test data which will be described in greater detail below.

In fact the system described comprises means for detecting activation of means 3 for applying the vehicle's emergency braking and means for detecting stopping of the latter which are designed to activate/deactivate operation of the means for the acquisition of information on the speed and distance run by the vehicle during the period of time between that activation of the application means and stopping of the vehicle and means for analysing this information to provide at least information on the distance run by the vehicle during that period.

Thus for example detection of activation of the means for applying the vehicle's emergency braking, indicated by general reference number 3 in this FIG. 1, may be provided by information processing unit 5 which activates both braking means 4 and operation of the means for acquiring information on speed and distance run provided by corresponding means 1 and 2, these acquisition means being for example provided by tool 9.

This information is in fact transmitted for example by information processing unit 5 to this tool 9, using the information transmission means 8 previously described.

The corresponding information is then received in the means forming input buffer 13 of unit 14, and may then be stored in data storage means 16 prior to processing.

This unit 14 of tool 9 is in fact designed to provide information on the vehicle's emergency braking characteristics, as will be described in greater detail below, from information originating from processing unit 5.

FIG. 2 shows a block diagram illustrating this information acquisition phase. This acquisition phase starts with a stage indicated by general reference number 20 during which the unit, for example 5, monitors the activation of means 3 applying the vehicle's emergency braking.

As soon as these means are activated, information on the vehicle's speed and distance run are acquired in stage 21 by, for example, unit 14.

This acquisition continues as long as the vehicle is not at rest, that is while the speed of the vehicle is not equal to zero, as determined during stage 22.

Of course additional emergency braking characteristics may be provided by processing unit 14.

In fact, in addition to information on distance run by the vehicle during the stopping period, the analysis means comprising tool 9 may also be designed to provide information on the instantaneous deceleration of the vehicle during that period of time. This is then calculated from the information available by processing unit 14.

Furthermore these analysis means may also be designed to provide information on the response time of the vehicle's braking means following activation of the means for applying the emergency braking.

The determination of this response time will be described in greater detail below.

Of course these analysis means may be designed to provide the or each of the vehicle's braking characteristics in real time or in delayed time.

FIG. 3 shows a block diagram illustrating the processing carried out by unit 14 in order to provide this information.

This block diagram starts with a stage 23 of determining or calculating the corresponding information, that is the distance run, the instantaneous deceleration and/or the response time of the braking means, from the information acquired.

During stage 24 information processing unit 14 may be caused to acquire information relating to the test configuration of in order to apply corrections to the values determined or calculated in stage 25, as will be described in greater detail below.

This information relating to the test configuration is for example stored in means 19 associated with unit 14.

In the course of stage 26 information processing unit 14 may be caused to acquire information relating to corresponding predetermined values, braking characteristics, also stored for example in means 19.

This then makes it possible for example for processing unit 14 to compare the values derived from corresponding predetermined data for a predetermined type of vehicle and a predetermined test configuration in the course of stage 27, these data being also stored for example in memory means 19, to provide a result relating to this comparison in 28 and therefore, if required, information relating to the fact whether the vehicle and more particularly its braking means do or do not function correctly.

As a correction applied to the characteristics provided, it is possible for example to envisage correction of the information on distance run by the vehicle determined from the information provided by the corresponding acquisition means in order to take into account the reaction time of those acquisition means.

It is known in fact that these acquisition means, in particular when they use calculators, function at relatively high frequencies. Corresponding values are therefore acquired in a periodical fashion and information may be lost, in particular at the time when emergency braking is applied, if this takes place for example in the course of a calculator cycle, because the effective acquisition of information will not start until the next cycle.

For safety reasons it may therefore be desirable to add the maximum distance which the vehicle could have run in the course of one calculator cycle to the distance run as calculated.

This then makes it possible to take into account the reaction time of the acquisition means.

The analysis means also comprise, as indicated previously, means through which information on the braking means' response time following activation of the means applying the emergency braking can be provided.

This is illustrated for example in FIG. 4, which shows an instantaneous deceleration curve for a train. The analysis means then comprise means for calculating the response time information using the relationship:

$$te=tr+tt/2$$

where:

te: indicates the response time, tr: indicates the elapsed time between the onset of braking and the time when the vehicle's acceleration reaches 10% of the steady-state deceleration value, and tt: indicates the elapsed time between the onset of braking and the time when the vehicle's deceleration reaches 90% of the steady-state deceleration value.

The steady-state deceleration value may then be the arithmetic mean of points measured in nominal mode.

Of course calculation other than that described above may be envisaged for this response time.

The cyclical operation of the calculators may also result in large variations from one calculator cycle to another when determining the vehicle's deceleration, where the operating frequency of the calculators is slow.

As illustrated in FIG. 5, this yields a curve showing a so-called "saw tooth" phenomenon, which is associated with an excessively long calculator period.

In order to overcome this problem the analysis means may incorporate means to smooth the vehicle deceleration information and these smoothing means may for example comprise sliding time window filtering means in a conventional way.

The deceleration curve can thereby be smoothed as illustrated in FIG. 6.

Of course other smoothing means may be envisaged.

Finally, the results provided during the test by for example a particular vehicle, in a particular test field and under particular conditions may be compared with predetermined corresponding information stored for example in means 19, as has been described previously.

Storage means 19 then contain predetermined test information for predetermined elements.

It may then be necessary to apply various corrections to the values provided in order to permit consistent comparison between the braking characteristics provided by the analysis means described previously and corresponding data predetermined for predetermined test conditions, a predetermined type of vehicle and a predetermined test configuration.

Thus for example it may prove to be necessary to make corrections associated to the fact that in the course of the test the vehicle's speed does not entirely correspond to the speed in a predetermined test whose characteristics are recorded in storage means 19.

Of course different types of corrections may be envisaged.

FIG. 7 illustrates one embodiment of the presentation of different information and results obtained in a test on a particular vehicle.

This figure shows the instantaneous deceleration curve as recorded, this curve being indicated by general reference number 29 in this figure, various items of information relating to the test condition, such as for example the weather conditions, speed, etc., information relating to the vehicle tested, the response time te indicated by general reference number 30 in that figure, measured stopping distance information indicated by general reference number 31, which may be corrected as indicated by general reference number 32 in the manner described previously, and various other items of information which make it possible to check that the vehicle and in particular the latter's braking means are functioning correctly.

Purely by way of illustration a plateau indicated by general reference number 33 may be observed in the deceleration curve, towards the end of it, and with the present structure of braking systems for vehicles of this type this corresponds to release of the magnetic brake shoes of for example a train, which makes it possible to check that they are operating satisfactorily.

These various items of information are then stored in information storage means 16 (FIG. 1), to ensure preservation and traceability of the tests, and may also be displayed visually to an operator for example on interface means 17 and possibly printed using printer 18.

Yet other embodiments of such a system may of course be envisaged.

The invention claimed is:

1. System for automatically determining the emergency braking characteristics of a vehicle, in particular a railway vehicle, used for public transport, comprising means (1) for measuring the speed of the vehicle, means (2) for measuring the distance run by the latter, and means (3) for applying the vehicle's emergency braking to activate the latter's braking means (4), characterised in that it comprises means (5) to detect activation of the means (3) applying the vehicle's emergency braking and means (5) for detecting stopping of the vehicle, designed to activate/deactivate the functioning of means (9) for acquiring information on the speed and distance run by the vehicle during the period of time between activation of the means applying the emergency braking and stopping of the vehicle, and means (9) for analysing this information to provide at least information on the distance run by the vehicle during that period and information, on the response time (te) of the vehicle's braking means (4) following activation of the means (3) applying the emergency braking.

2. Means according to claim 1, characterised in that the analysis means (9) are also designed to provide information on the instantaneous deceleration of the vehicle during this period of time.

3. System according to claim 2, characterised in that the analysis means (9) comprise means for smoothing the vehicle deceleration information.

4. System according to claim 3, characterised in that the smoothing means comprise sliding time window filtering means.

5. System according to claim 1, characterised in that the analysis means (9) are designed to provide the or each characteristic of the braking in real time.

6. System according to claim 1, characterised in that the analysis means (9) are designed to provide the or each characteristic in delayed time.

7. System according to claim 1, characterised in that the analysis means (9) comprise means for correcting the information on distance run by the vehicle determined from the information provided by the acquisition means to take into account the reaction time of those acquisition means.

8. System according to claim 1, characterised in that the analysis means (9) comprise means for calculating information on the response time of the braking means (4) according to the relationship $t=tr+tt/2$ where te represents the response time, tr represents the time between the onset of braking and the time when the vehicle's deceleration reaches 10% of the steady-state deceleration value and tt represents the time between the onset of braking and the time when the vehicle's deceleration reaches 90% of the steady-state deceleration value.

9. System according to claim 1, characterised in that the analysis means (9) comprise means for comparing the or each braking characteristic provided with corresponding predetermined data for predetermined test conditions, a predetermined type of vehicle, and a predetermined test field configuration, these data being stored in memory means (19) associated with analysis means (9).

* * * * *